June 28, 1932.   C. E. PALMQUIST   1,865,205
FASTENER FOR AUTOMOBILE TRUCK DOORS
Filed Oct. 22, 1929
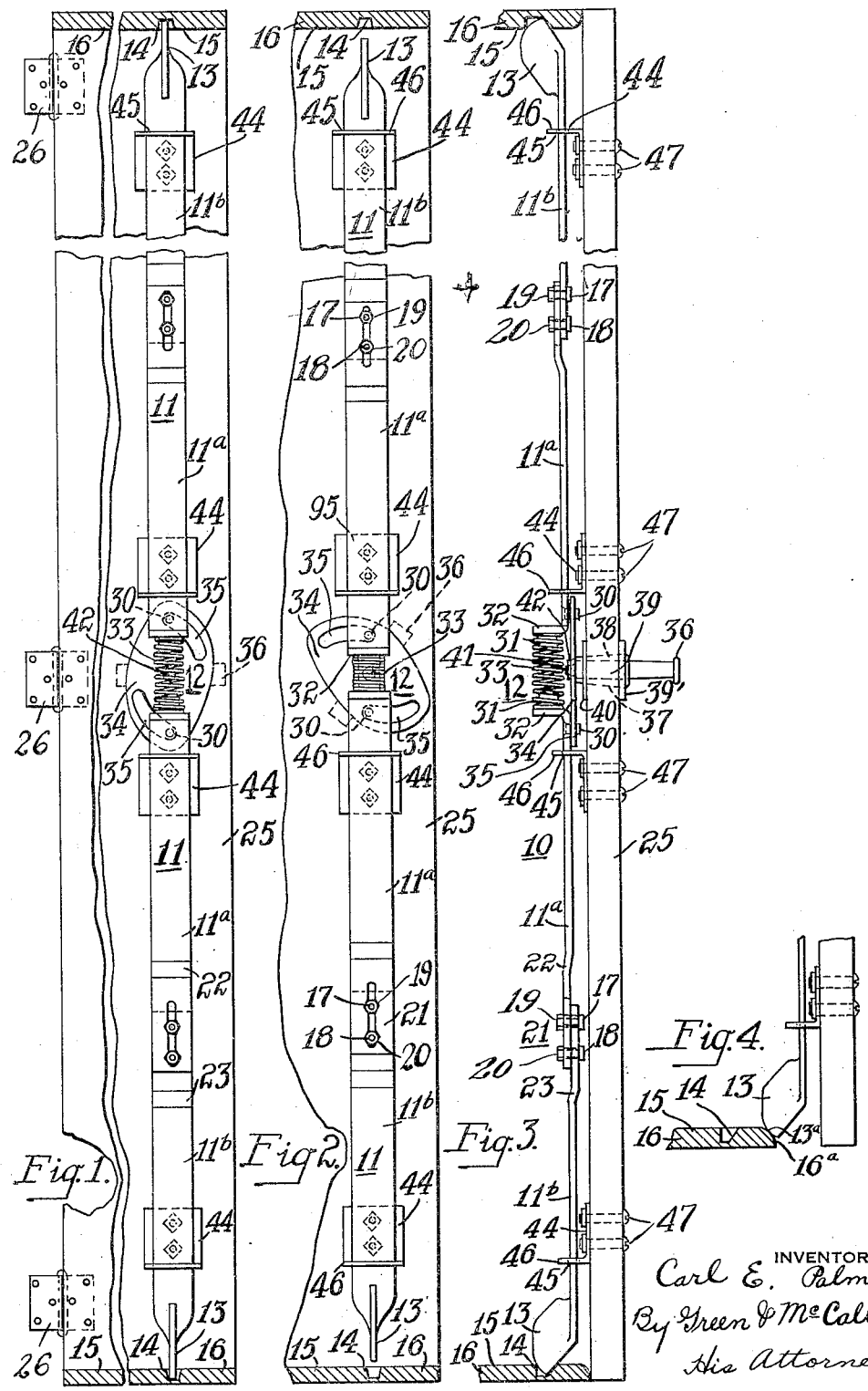
INVENTOR
Carl E. Palmquist
By Green & McCallister
His Attorneys Patented June 28, 1932

1,865,205

UNITED STATES PATENT OFFICE

CARL E. PALMQUIST, OF OLEAN, NEW YORK, ASSIGNOR TO MUTUAL ENGINEERING CORPORATION, A CORPORATION OF NEW YORK

FASTENER FOR AUTOMOBILE TRUCK DOORS

Application filed October 22, 1929. Serial No. 401,473.

This invention relates to door fastening devices, and more particularly to heavy duty devices such as are suitable for the doors of commercial delivery types of automobile bodies.

Although the design, fabrication, and construction details of automobile passenger car bodies have undergone much research and study, yet, commercial truck or delivery bodies have been somewhat neglected, resulting in a somewhat one-sided development.

The automobile manufacturers have not, in general, built commercial truck bodies with niceties and accuracies of construction details, due in part, no doubt, to the fact that in the early days of the industry they felt that a poorly designed body would at least outlast the chassis and motor whose life period was appreciably lowered by the long-continued, heavy, and exacting demands of commercial and trucking service. Then too, it does not pay the manufacturers to design a body to meet the requirements of each individual purchaser; they have found these requirements are peculiar and distinct as to a given buyer. Automobile companies have placed a chassis on the market which includes the motive working parts, so that each buyer can then build a body to meet his own peculiar requirements.

Thus, from the above explanation, it will be readily understood that the construction details and problems of commercial bodies has not received the degree of study and improvement necessarily commensurate to the vastly improved motor and chassis of our present day commercial truck. Also, our present day demands are more rigid, exacting, and long-continued—the motor and chassis are capable of meeting these demands, but, in general, the body is still more or less in the early stages of development. This is particularly true as to light delivery trucks.

Buyers of light delivery trucks are asking for an attractive, yet absolutely water tight, dust proof, and noiseless body. They have found that such trucks may be a medium of good or bad advertising to the public, as in the case of our modern department store delivery automobile. People tend more and more to judge a given concern by its equipment, and by the service rendered. And the latter feature, that of service, is dependent to a great extent upon proper treatment of the packages, produce, and like articles during transit, that is, keeping them free from action of the elements, dust, rain, mud, and the like. Then too, the operators or drivers, themselves, are becoming more exacting as to noises inherently the result of inaccuracies and weaknesses of construction.

I have keenly felt this need of improvement and have made a thorough study of the situation in order that I might solve the problems arising from or inherent in construction details that appear to me in a more glaring light. In other words, I have selected those construction details for thorough study which to me give rise to many of the difficulties and problems of body design.

Many of these problems inherent in body structures, and to me, capable of solution, arise from the necessity for a delivery door and a fastening means, such as a latch, therefor. Doors have always given rise to many problems, not only in the automobile, but also in the general building industry. In the former, of course, the problem has, and is, becoming more and more complex due in part, at least, to the long periods of continued use, to the vibration of working parts, and to "jars" of the road. Any slight inaccuracy in the construction of such doors, any looseness or any slight defect or weakness will show up in a short time, especially in commercial usage. Squeaks, knocks, rattles, thumps, rubs, and crackles are extremely annoying, sound evidences of some of these defects. Then too, the door after some use, may have a tendency to fly open and spill its contents, to permit the elements such as rain and dust to enter; and, it may become impossible to latch, shut, or completely close; and further, it may become stiff and difficult of closure as well as of opening.

A poor latch, may not only be inordinately difficult of action and weak as to structure, but also may increase the burden that must be borne by the hinges.

Many of the present day truck doors are of wood, of wood with sheet metal covering, or of cheap, sheet-metal construction. The tendency of the wooden doors to crack and warp, of the metal doors to bend, and of both to wear, should be offset by the latch. But the ordinary latch or fastener has no means whereby it may be adjusted to make allowances for wear, and the like. Then too, the parts of an ordinary delivery truck door latch are not capable of replacement—maintenance is extremely high.

Since the local carpenter may be called upon to construct the body, it is even more desirable to provide a latch that may be used for a variety of size installations, in order that the hardware dealer need only "stock up" one size of latches, and that this particular size may be adjusted to meet all size demands.

From the above and many other considerations, there is a need, yet unfulfilled, for a fastener or latch that will be inexpensive, simple and easy of installation, capable of adjustment to meet the requirements of each individual, capable of adjustment for compensation as to considerations such as wear and warp, heavy enough for its service yet not clumsy or stiff in operation, sensitive but not delicate of mechanism, capable of fabrication from ordinary metals, and whose parts are capable of replacement and of standardized high quantity production methods.

An object of this invention has been to provide a fastener or latch for a door that will appreciably aid the hinges in supporting the door while in closed position.

Another object of this invention has been to provide a fastener or latch for a door which although subject to standardized production methods, can be adapted to meet individual requirements.

Another object of this invention has been to provide a fastener or latch for a door whose parts are capable of ready replacement.

A further object of this invention has been to provide a fastener or latch for the door of an automobile that is sensitive and positive in action.

A further object of this invention has been to provide a door latch or fastener that will always hold the door tightly shut.

A still further object has been to provide a more efficient fastener or latch for the door of an automobile.

These and many other objects of this invention will appear to those skilled in the art from the following description taken in conjunction with the accompanying drawing, in which:

Fig. 1 is a back view in elevation of a door fastener or latch in accordance with one embodiment of my invention.

Fig. 2 is a view similar to that of Fig. 1, but showing the latch in unlocked position.

Fig. 3 is a side view of the embodiment shown in Fig. 1.

Fig. 4 is a side fragmental view of the latching or locking portion shown in Fig. 3, but with the door in partially open position.

The specific embodiment of my invention shown in the drawing includes a fastener, designated in its entirety by 10 having similarly constructed locking or latching members 11 and an operating mechanism 12.

Each of the latching members, designated in its entirety by 11, is provided with an integral web latch 13 of flat-metal material and a peculiar form; the purpose thereof will be more readily understood after a study of Figs. 1, 2, and 4. The web latch 13 is adapted to engage a grooved stop 14, suitably cut out or mounted in or on a face 15 of the door frame 16, so that the door will be rigidly held in closed position. The opposite edges of each web latch adjacent its associated latching member $11^b$ have a straight-line and parallel inclination with respect to each other, and terminate in, or are connected up by a common arc.

In order that each of the latching members 11 can be adjusted to meet the size requirements of a given door, each member, preferably of fabricated steel or flat-metal strap, may be composed of two or more sections, but only two, $11^a$ and $11^b$, are shown. The primary section $11^a$ is drilled for receiving bolts 17 and 18, and the secondary section $11^b$ is slotted for a suitable distance to permit the bolts 17 and 18 to slide longitudinally therein so that one section can be adjusted with respect to the other, and that their common joint 21 can be secured by nuts 19 and 20 cooperating with their respective bolts 17 and 18. Although, I have slotted the secondary member $11^b$ and drilled the primary member $11^a$ to support the bolts 17 and 18, yet it will be understood that the primary member $11^a$ can be slotted instead of the secondary member, or both primary and secondary members can be slotted, if desired, to meet the demands of a given situation. Also, any suitable adjustable means can be employed instead of the means 21.

If the adjusting means 21 is employed, it is advisable to bend the primary and secondary members $11^a$ and $11^b$ as shown at points 22 and 23, so that the means 21 will be offset from the door 25 upon which the fastener 10 is to be mounted. The bends 22 and 23 do not have to conform to the particular pattern shown, but may have any form adaptable for the purpose set forth.

Each of the primary members $11^a$ is provided with an inner, right-angularly bent end adjacent the like end of the other member $11^a$; each member $11^a$, near the inwardly-bent portion thereof, having an outwardly extending lug 30; upon the face of the inwardly-bent portion or stop flange 32, an extending spring guide knob 31 has been rigidly secured. In order that the web latch 13 of each of the two latching members 11 will be held in position against its grooved stop 14, a spring 33 has been provided and mounted between the extending spring guide knobs 31 of the two similar latching members 11.

But in order to unlock the door 25 from its frame 16, an operating mechanism 12 for the fastener 10 has been prepared which includes an eccentric, egg-shaped, flat-metal disc 34, having two oppositely disposed arcuately extending slots cut therein at 35, each slot being adapted to receive the extending lug 30 of one of the primary members 11$^a$. The operating mechanism 12 is designed to compress the spring 33, and thus draw the web latch 13 of each of the locking members 11 out of engagement with the grooved, countersunk stop 14; to accomplish this compression, the eccentric disc 34 must be partially rotated so that the extending lugs 30 cooperating with the eccentrically cut guide slots 35 will compress the spring 33. It will be noted that the stop 14 has a complementary rear face or edge corresponding to the rear edge of the latching point of the web 13.

In order that the eccentric disc 34 may be partially rotated for the above purpose, a handle grip 36, is rotatably mounted in the door 25. The handle grip 36, adapted to extend through a suitable hole 37 drilled in the door, is provided with a shell portion 38 within which an extending rod portion 39 integral with the grip 36 is adapted to be rotatably supported, or journaled, if so desired. The shell portion 38 also extends through the hole 37 and is threaded on its outer circumference, so that the positioning nuts 39' and 40 may be threaded thereon to securely clamp this shell portion 38 to the door 25 from both sides thereof.

The rod portion 39 rotatably mounted in the shell portion 38 has a reduced end 41 upon which the nut 42 is threaded. The nut 42 clamps the eccentric disc 34 to the rod extension of the handle grip 36 so that a partial rotation of the former will be imparted to the latter.

Any suitable bracket may be employed for mounting the latching members 11 of the fastener 10 upon a door 25. The L brackets 44 shown in the drawing are provided with a transversely extending slot 45 on one face 46, and are drilled to receive suitable mounting bolts 47 on the other face thereof. The bolts 47 extend from the door and have suitable nuts thereon. The slots 45 of each L bracket 44 is cut to permit the latching members 11 to longitudinally slide therethrough.

The grooved stops 14 are either cut or formed in the faces of the door frame, or mounted therein (if separately formed). The edge of the frame 16 is preferably rounded as shown at 16$^a$ so that the rounded edge 13$^a$ of each web latch portion 13 may be pushed thereover and into its groove stop. The stops 14 have a straight-line inclined rear edge and right-angularly positioned bottom and front edges.

It will be noted that the web latch 13 and the stop groove 14 are so formed as to permit the door 25 to be pushed shut, but as to prohibit the door 25 being opened except by partial rotation of the handle grip 36 of the operating mechanism 12.

Although I have shown the fastener 10 mounted so that its web latches 13 are adapted to engage the top and bottom faces of the door frame 16, which is the ideal location when the hinges are mounted on one side of the door, yet, my fastener may be mounted transverse of the truck door if the hinges are mounted on the top or bottom thereof. In other words, the fastener 10 should preferably be mounted so that its longitudinal plane is parallel to the plane of the axes of hinges 26 of the door 25.

Although the handle grip 36 of the operating mechanism 12 can be partially rotated for the purpose of lifting the latching members 11 out of engagement with the faces 15 of the door frame 16, when one wishes to open or close the door, yet such is not necessary in the latter, or closing operation. As before explained, the door 25 can be merely pushed shut, but due to the peculiar forms of the members of my invention, it is absolutely impossible to push the door 25 open when it is in closed position; a partial rotation of the handle grip 36 is necessary. The advantages of these features need no further comment.

It will also be noted that the operating mechanism 12 of the fastener need not be exactly centered in respect to its working position on the door 25; the adjusting means 21 of each latching member 11 can be independently adjusted to meet the length demands for that particular member.

From the drawing it will be seen that the fastener 10 will hold the door 25 upon which it is mounted in rigid closed position. The spring 33, having a straight line position with respect to each web latch 13, can exert its maximum strength for holding the fastener in locked position.

Due to the rigid supporting of the door 25 while in closed position, it will not be permitted to vibrate at a period at variance with that of the body of the automobile; and thus it is prevented from setting up sound annoyances. The double latching feature provides the necessary strength of fastening means and permits the door to be securely and rigidly held as well as supported in closed position.

While I have described but one embodiment of my invention, it will be apparent that many changes, modifications, substitutions, additions, and omissions, or combination thereof may be made in this device without departing from the spirit and scope of the invention as indicated in the appended claims.

What I claim as new and desire to secure by Letters Patent is:

1. In an automobile door fastener for mounting on a door and holding it in position with respect to the frame the combination of two oppositely-extending resilient latching members of flat-strap metal, and means for operating said latching members, and means for resiliently holding said latching members against said frame, each of said latching members terminating at one end thereof in an integral web latch portion disposed at right angles thereto and extending inwardly therefrom said web latch portion from points adjacent to said latching member having parallelly inclined opposite edges terminating in a common edge of curved outline, the inclined rear edge of said web latch portion corresponding to an inclined rear edge of a stop positioned in the frame, said stop having a front and bottom edge positioned at right angles with respect to each other, so that said door may be pushed into locking position and may only be unlocked by said operating means.

2. In an automobile door fastener for mounting on a door and holding it in position with respect to the frame and having a suitable operating means, the combination of two oppositely extending resilient latching members of flat-strap metal, said latching members at their inner ends cooperating with said operating means, and a common means for resiliently holding said latching members against the frame, each of said latching members terminating at one end thereof in a web latch portion disposed at right angles thereto and extending inwardly therefrom said web latch portion from points adjacent to said latching member having parallelly inclined opposite edges terminating in a common edge of curved outline, the inclined rear edge of said latch portion corresponding to an inclined rear edge of a stop positioned in the frame, said stop having a front and bottom edge positioned at right angles with respect to each other, so that said door may be pushed into locking position and may only be unlocked by said operating means.

3. In a door fastener for mounting on a door and holding it in position with respect to the frame, the combination of oppositely extending latching members of resilient metal construction, and means for operating said latching members, means for resiliently holding said latching members against said frame, each of said latching members terminating at one end thereof in a web latch portion disposed at right angles thereto and extending inwardly therefrom, said web latch portion from points adjacent to said latching member having a vertically inclined latching edge and an opposite inclined edge terminating in a common edge of curved outline the inclined latching edge of said web latch portion corresponding to the inclined rear edge of a stop positioned in the frame and co-operating therewith for holding the door in fastened position, said stop having a front and bottom edge positioned at an angle with respect to each other, said common edge of curved outline of said web latch portion being positioned to extend to a point adjacent the front edge of said stop when the door is in fastened position, so that said door may be pushed into locking position and may only be unlocked by said operating means.

In testimony whereof, I have hereunto subscribed my name this 19th day of October, 1929.

CARL E. PALMQUIST.